US011080435B2

(12) United States Patent
Bourhani et al.

(10) Patent No.: US 11,080,435 B2
(45) Date of Patent: Aug. 3, 2021

(54) SYSTEM ARCHITECTURE WITH VISUAL MODELING TOOL FOR DESIGNING AND DEPLOYING COMPLEX MODELS TO DISTRIBUTED COMPUTING CLUSTERS

(71) Applicant: Accenture Global Solutions Limited, Dublin (IE)

(72) Inventors: Milad Bourhani, Bologna (IT); Fabio Bucci, San Giovanni in Persiceto (IT); Jaeyoung Christopher Kang, Berkeley, CA (US); Teresa Tung, San Jose, CA (US); Louis Farfan, El Segundo, CA (US)

(73) Assignee: Accenture Global Solutions Limited, Dublin (IE)

( * ) Notice: Subject to any disclaimer, the term of this patent is extended or adjusted under 35 U.S.C. 154(b) by 149 days.

(21) Appl. No.: 15/420,947

(22) Filed: Jan. 31, 2017

(65) Prior Publication Data
US 2017/0316114 A1    Nov. 2, 2017

Related U.S. Application Data

(60) Provisional application No. 62/329,824, filed on Apr. 29, 2016.

(51) Int. Cl.
*G06F 30/00*    (2020.01)
*G06F 3/0482*    (2013.01)
(Continued)

(52) U.S. Cl.
CPC .......... *G06F 30/00* (2020.01); *G06F 3/0482* (2013.01); *G06F 8/34* (2013.01); *G06F 3/04845* (2013.01); *G06F 2111/02* (2020.01)

(58) Field of Classification Search
CPC .......... G06F 17/50; G06F 3/0482; G06F 8/34; G06F 3/04845; G06F 2217/04
See application file for complete search history.

(56) References Cited

U.S. PATENT DOCUMENTS 5,991,535 A    11/1999  Fowlow et al.
6,208,345 B1 *  3/2001  Sheard ...................... G06F 8/34
                                          709/201
(Continued)

FOREIGN PATENT DOCUMENTS

EP    2 463 790    6/2012

OTHER PUBLICATIONS

Raikwal, J. S., and Kanak Saxena. "Performance evaluation of SVM and k-nearest neighbor algorithm over medical data set." International Journal of Computer Applications 50, No. 14 (2012). (Year: 2012).*

(Continued)

*Primary Examiner* — Chuen-Meei Gan
(74) *Attorney, Agent, or Firm* — Brinks Gilson & Lione

(57) ABSTRACT

A distributed computing design system facilitates the creation and deployment of complex data and mathematical models. In one implementation, the system generates a graphical user interface of a visual distributed computing design workspace. The visual distributed computing design workspace includes a node palette comprising individually selectable nodes, each with a graphical representation and corresponding to a distributed computing function available on a pre-determined target distributed computing cluster, a linking tool for establishing connection links between the individually selectable nodes, and a digital canvas. The system, with modeling circuitry, responds to interactions with the graphical user interface to facilitate visually building a data model by accepting node selections of specific nodes from the node palette, placing the specific nodes on (Continued)

the digital canvas, accepting linking selections of dataflow connections between the specific nodes, and linking the specific nodes as specified by the linking selections.

14 Claims, 6 Drawing Sheets

(51) Int. Cl.
    *G06F 8/34*           (2018.01)
    *G06F 111/02*        (2020.01)
    *G06F 3/0484*       (2013.01)

(56) References Cited

U.S. PATENT DOCUMENTS

| | | | |
|---|---|---|---|
| 7,092,941 B1* | 8/2006 | Campos | G06K 9/6218 707/737 |
| 7,636,894 B2* | 12/2009 | Vedula | G06F 8/34 707/999.1 |
| 8,250,009 B1 | 8/2012 | Breckenridge et al. | |
| 8,271,541 B2 | 9/2012 | Mohan et al. | |
| 8,364,613 B1 | 1/2013 | Lin et al. | |
| 8,719,804 B2 | 5/2014 | Jain | |
| 8,886,788 B2* | 11/2014 | Tung | G06F 9/5072 709/224 |
| 9,043,337 B1* | 5/2015 | Chen | G06F 17/30569 706/12 |
| 10,387,798 B2 | 8/2019 | Duggan et al. | |
| 10,438,132 B2 | 10/2019 | Duggan et al. | |
| 2005/0171746 A1* | 8/2005 | Thalhammer-Reyero | G05B 17/02 703/2 |
| 2005/0203764 A1* | 9/2005 | Sundararajan | G06F 8/10 717/105 |
| 2006/0259908 A1 | 11/2006 | Bayer | |
| 2007/0016615 A1* | 1/2007 | Mohan | G06F 8/20 |
| 2007/0157179 A1* | 7/2007 | Seeger | G06F 8/34 717/136 |
| 2007/0240080 A1* | 10/2007 | Eldridge | G06F 3/0486 715/835 |
| 2012/0191630 A1* | 7/2012 | Breckenridge | G06N 20/00 706/12 |
| 2012/0284600 A1* | 11/2012 | Lin | G06N 20/00 715/212 |
| 2013/0144819 A1 | 6/2013 | Lin | |
| 2013/0152047 A1 | 6/2013 | Moorthi et al. | |
| 2014/0046879 A1 | 2/2014 | Maclennan et al. | |
| 2014/0278312 A1* | 9/2014 | Nixon | G06F 17/5009 703/6 |
| 2014/0279725 A1 | 9/2014 | Kuusela | |
| 2015/0161385 A1 | 6/2015 | Gounares | |
| 2015/0170048 A1 | 6/2015 | Lin et al. | |
| 2015/0235143 A1* | 8/2015 | Eder | G16H 50/50 706/12 |
| 2015/0321427 A1 | 11/2015 | Gunnarsson | |
| 2015/0339572 A1 | 11/2015 | Achin et al. | |
| 2015/0341212 A1* | 11/2015 | Hsiao | H04L 41/0813 715/735 |
| 2015/0378716 A1* | 12/2015 | Singh | H04W 4/60 717/172 |
| 2016/0132787 A1 | 5/2016 | Drevo | |
| 2016/0300156 A1 | 10/2016 | Bowers | |
| 2016/0307115 A1 | 10/2016 | Wu | |
| 2017/0085470 A1* | 3/2017 | Rahamim | H04L 45/306 |
| 2017/0115964 A1 | 4/2017 | Vadapandeshwara et al. | |
| 2017/0178019 A1* | 6/2017 | Duggan | G06F 8/60 |
| 2017/0178020 A1 | 6/2017 | Duggan | |
| 2017/0178027 A1* | 6/2017 | Duggan | G06F 17/30312 |
| 2017/0316114 A1 | 11/2017 | Bourhani et al. | |
| 2018/0032038 A1 | 2/2018 | Kang et al. | |

OTHER PUBLICATIONS

European Patent Office, European Search Report from European Patent Application No. 17167892.3 date published Nov. 1, 2017, 2 pages.
Australian Patent Office, First Examination Report for Australian Patent Application No. 2016259298 dated Apr. 21, 2017, 6 pages.
Australian Patent Office, Second Examination Report for Australian Patent Application No. 2016259298 dated Jul. 31, 2017, 3 pages.
Australian Patent Office, First Examination Report from Australian Patent Application No. 2016259300 dated Apr. 12, 2017, 5 pages.
Australian Patent Office, Notice of Acceptance from Australian Patent Application No. 2016259300 dated May 24, 2017, 3 pages.
European Patent Office, Extended European Search Report for European Patent Application No. 16199043.7 dated May 18, 2017, 10 pages.
European Patent Office, Extended European Search Report from European Patent Application No. 16199057.7 dated May 22, 2017, 7 pages.
Guazzelli et al., "Efficient deployment of predictive analytics through open standards and cloud computing." ACM SIGKDD Explorations Newsletter 11(1), pp. 32-38, 2009, [retrieved from Internet on Apr. 11, 2017] <URL: http://zementis.com/docs/SIGKDD_ADAPA.pd>.
Guazzelli et al. "PMML: An open standard for sharing models." The R Journal 1(1), pp. 60-65, 2009, [retrieved from Internet on Sep. 11, 2017] <URL: https://journal.r-project.org/archive/2009-1/RJournal_2009-1_Guazzelli+et+al.pdf>, 6 pages.
Kosaku et al., "Runtime Composition for Extensible Big Data Processing Platforms", 2015 IEEE 8th International Conference on Cloud Computing, Jun. 1, 2015, pp. 1053-1057, XP055272472, DOI: 10.1109/CLOUD.2015.151, ISBN 978-1-4673-7287-9.
Sun et al., "Towards Delivering Analytical Solutions in Cloud: Business Models and Technical Challenges", 2011 Eight IEEE International Conference on e-Business Engineering, pp. 347-351, IEEE, 20111.
Australia Patent Office, Examination Report No. 1 for Australia Application No. 2017202599 dated Oct. 20, 2017, 8 pages.
Australian Patent Office, Examination Report No. 2 for Australian Patent Application No. 2017202599 dated Apr. 6, 2018, pp. 1-3.
Extended European Search Report in European Application No. 17167892.3, dated Sep. 14, 2017, 9 pages.
Communication Pursuant to Article 94(3) EPC in European Application No. 17167892.3, dated Aug. 22, 2019, 7 pages.
Australian Patent Office, Examination Report No. 2 for Australian Application Serial. No. 2017202599, dated Apr. 6, 2018, pp. 1-3.
Australian Patent Office, Notice of Acceptance for Australian Application Serial No. 2016259300, dated May 24, 2017, 3 pages.
U.S. Patent Office, Final Office Action issued in U.S. Appl. No. 15/198,711 dated Dec. 26, 2018, 24 pages.
U.S. Patent Office, Non-Final Office Action issued in U.S. Appl. No. 14/971,987 dated Feb. 28, 2019, 10 pages.
U.S. Patent Office, Non-Final Office Action issued in U.S. Appl. No. 14/971,982 dated Dec. 26, 2018, 14 pages.
U.S. Patent Office, Notice of Allowance issued for related U.S. Appl. No. 14/971,982 dated Jun. 20, 2019, 8 pages.
Notice of Allowance issued for related U.S. Appl. No. 14/971,987 dated Jul. 23, 2019, 6 pages.
Office Action in Europe Application No. 16199057.7, dated Jun. 8, 2020, 5 pages.

\* cited by examiner

SYSTEM ARCHITECTURE WITH VISUAL MODELING TOOL FOR DESIGNING AND DEPLOYING COMPLEX MODELS TO DISTRIBUTED COMPUTING CLUSTERS

CROSS-REFERENCE TO RELATED APPLICATION

This application claims the benefit of U.S. Provisional Application No. 62/329,824, filed Apr. 29, 2016, the contents of which are hereby incorporated by reference in their entirety.

TECHNICAL FIELD

This disclosure relates to machines and complex system architectures that provide a visual modeling tool to design, code, deploy, and monitor the execution of analytical models.

BACKGROUND

The field of data science, and more particularly, the development and implementation of analytical models, has typically required strong computer and processing system skills and familiarity with data science. These specialized skills were needed to develop, setup, and program model algorithms and to access and prepare data so that the data was effective for training the model, and so that running the model on the data would give meaningful results. These complex technical challenges have traditionally left scientists and engineers with the daunting task of building and implementing analytical models that are useful in their engineering and scientific fields. That is, analytical modeling is typically a field in which scientists and engineers have less familiarity, and which in any event is tangential to their primary goal of extracting insights from data.

DETAILED DESCRIPTION

The present disclosure provides tools and solutions to provide a technically innovative visual modeling tool to allow data scientists and engineers who are not experienced with programming to design, verify, and deploy analytical models with a full set of features and functionality. The visual modeling tool provides a graphical user interface (GUI) with which the user may interact to open, edit, create, design, verify, and deploy a new analytical model. In one approach, the visual modeling tool provides a visual modeling canvas and a user can select, drag, drop, edit, and connect nodes on the visual canvas. The nodes may represent or contain one or more data transformations available on a target distributed computing cluster. So configured, the visual modeling tool presents an analytical model in a visual manner that is user friendly and with which data scientist and engineers can easily interact.

Figure 1:
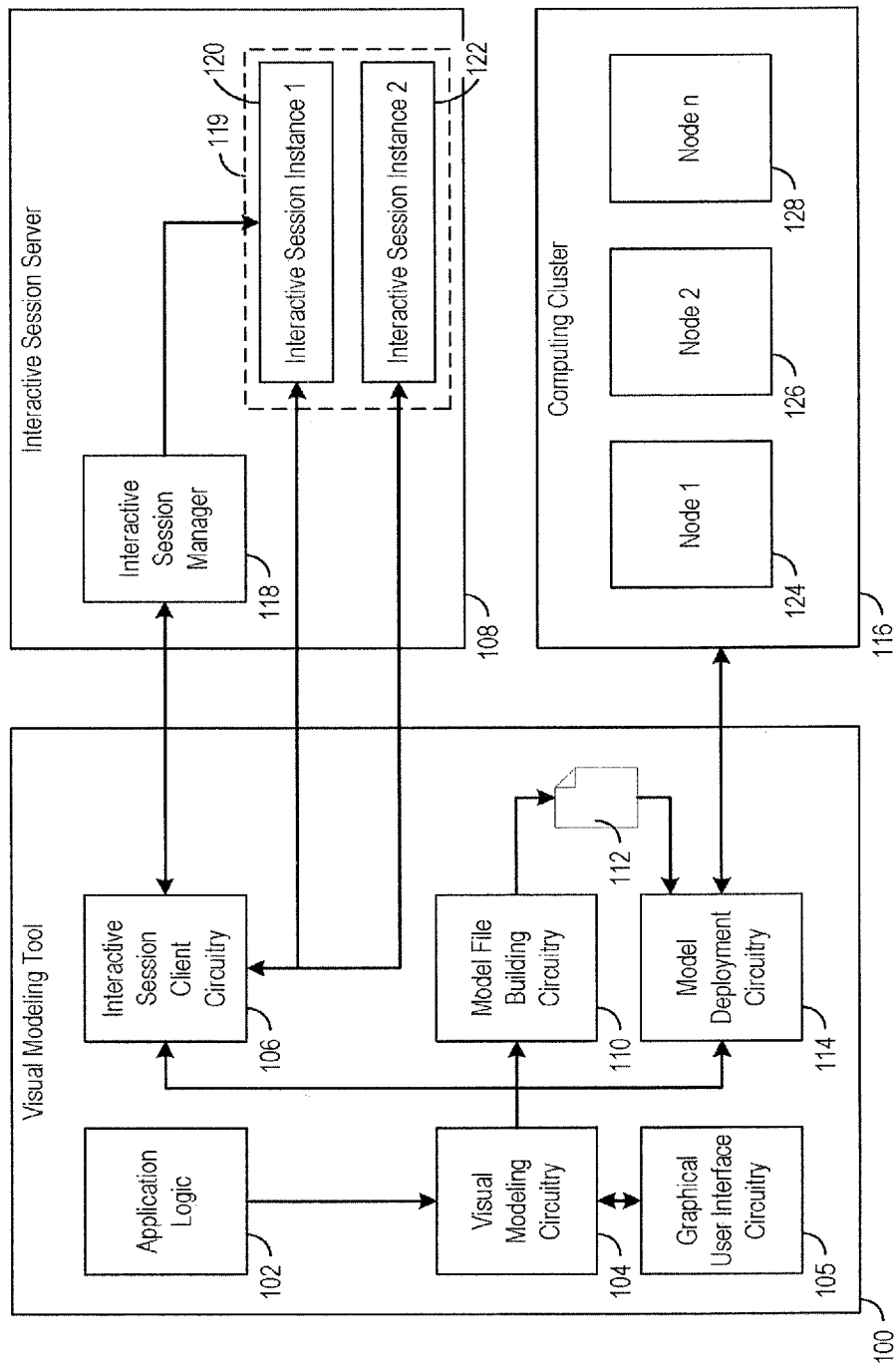
FIG. 1 shows an example system configuration and context for implementing a visual modeling tool.

FIG. 1 illustrates an example system configuration and context for implementing a visual modeling tool 100. The visual modeling tool 100 may also be considered a distributed computing design system. The visual modeling tool 100 may include circuitry to implement the visual modeling tool functionality. The visual modeling tool 100 may include application logic 102 and visual modeling circuitry 104. The application logic 102 may provide operating constraints and business logic rules for the functionality of the visual modeling circuitry 104, as discussed below. The visual modeling tool 100 may also include graphical user interface circuitry 105 to provide a graphical user interface to facilitate user interaction with the visual modeling circuitry 104. The visual modeling tool 100 may also include interface circuitry to implement interfaces with other systems. The visual modeling tool 100 may include interactive session client circuitry 106 to interface with an interactive session server 108. The visual modeling tool 100 may also include model file building circuitry 110 configured to build a deployment package 112, such as a model file that may include a trained model or code executable by a target distributed computing cluster ("computing cluster") 116. The visual modeling tool 100 may also include model deployment circuitry 114 configured to deploy the deployment package 112 to the computing cluster 116 and to interact with the computing cluster 116 to control execution of the model defined by the deployment package 112 executed by the computing cluster 116.

The computing cluster 116 may be a distributed computing cluster such as an Apache Spark computing engine, an R computing engine, Apache Mesos computing engine, an Amazon Web Services Elastic Map Reduce (AWS EMR) computing engine, an Apache Yarn computing engine, an Apache Hadoop computing engine, or any other distributed computing engine that may provide computing power such as processing power and memory space, as well as processing functions to implement different data model features involved in data analytics and modeling. The computing cluster 116 may provide different nodes 124, 126, 128 representing computational resources within the computing cluster 116 with which users may instantiate, reference, and apply data models to perform analytical functions on datasets including live data streams.

The interactive session server 108 may include an interactive session manager 118. The interactive session client circuitry 106 of the visual modeling tool 100 may interact with the interactive session manager 118 to spawn different interactive session instances 119 (e.g., the first interactive session instance 120 and the second interactive session instance 122) within the interactive session server 108. The interactive session client circuitry 106 may spawn dedicated distributed computing sessions on the interactive session server 108 to isolate instantiations of the data model from other instantiations. The interactive session instances 119 are dedicated interactive computing sessions executed on the interactive session server 108 and may represent versions of corresponding computing cluster nodes 124, 126, 128 within the computing cluster 116 with a specific functional subset.

For example, the interactive session instances 119 may have selectively reduced processing power or data handling capabilities as compared to the computing cluster nodes 124-128 of the computing cluster 116. However, unlike the computing cluster nodes 124-128 of the computing cluster 116, users may interface or control the interactive session instances 119 more directly such that users can receive results quickly, can receive intermediate results, and can alter aspects of a model and re-test the model. For example, the interactive session instances 119 can provide execution results for a data model executed on the interactive session server 108. Because of their selectively constrained computing power and increased interactive abilities, the interactive session instances 119, and the interactive session server 108 as a whole, provide users with the ability to dynamically and quickly develop and refine models without fully recompiling and deploying the models on nodes of the computing cluster 116. Thus, during model development, one goal of the interactive session is model training (e.g. to define the best model that solves a given analytical problem). During model training, data scientists or other users may work on a small subset of data (e.g., a training set) that can fit in memory, allowing the interactive session instances 119 to provide computational results quickly and interactively to users. After a model is trained, the computing cluster 116 will apply the trained model trained during model training on the interactive session instances 119. In the full implementation phase, the trained model may work on an entire dataset (e.g., which may not typically fit in memory of a single machine as a batch operation).

The interactive session server 108 may be a Spark interactive shell, though other interactive session server types are possible including, as examples, R, OpenCV, or Amazon Web Services® (AWS) interactive session servers. The interactive session server 108 may provide an Application Programming Interface (API) using a representational state transfer (REST) protocol. The interactive session server 108 may implement the REST API using Hypertext Transfer Protocol (HTTP), such that the API implements REST over HTTP. In this manner, the visual modeling tool 100 can interface with the interactive session server 108 over a network or the Internet using HTTP. For example, one computing device (e.g., a client device) may execute or implement the visual modeling tool 100 while a second computing device (e.g., a server) may execute or implement the interactive session server 108. In such an approach, the two devices (e.g., client and server devices) may communicate via the Internet or another network, for example, using the REST API over HTTP. In an alternative embodiment, the interactive session server 108 may be implemented or executed on the same computing device (e.g., the same computer) as the visual modeling tool.

Without the use of the visual modeling tool 100, a user must interface directly with an interactive session server 108 by entering Java code, Scala code, or Python code into a terminal in communication with the interactive session server 108. Unfortunately, such an approach requires the user to have a working understanding of such coding languages, a skill that many data scientists may not possess. Further, such an approach provides opportunities for errors in the entry of such code and may distract data scientists from the activity of developing quality data models by forcing them to focus on code syntax and commands.

The visual modeling tool 100 accomplishes many technical tasks, including providing data scientists and other users with a tool to visually create, alter, review, train, and deploy data models within a graphical user interface (GUI). The visual modeling tool 100 performs the technical task of creating and altering generated code, and providing the generated code to the interactive session server 108 or deploying the generated code to a target distributed computing cluster 116. These technical tasks are performed without the need for the user to manually enter code or changes to code, or for the user to even know what specific changes to code would result from making changes in the graphical user interface. For example, the visual modeling tool 100 facilitates making changes to the analytical modeling process without knowing specific technical aspects or code required to implement those changes in the computing cluster 116 or another target distributed computing environment. As such, technical benefits of the visual modeling tool 100 are realized including reducing manual intervention and involvement in code generation, reducing the possibility for human error, thereby increasing code generation efficiency and accuracy.

Further, the visual modeling tool 100, including the visual modeling circuitry 104, the graphical user interface circuitry 105, the interactive session client circuitry 106, the model file building circuitry 110, and the model deployment circuitry 114, improves the function of the underlying computer hardware and circuitry itself. That is, these circuitry elements and their technical functions described below are specific improvements in way that the underlying system and hardware operates. The technical improvements facilitate generation, implementation, and maintenance of code for data models with improved efficiency, accuracy, and precision. The technical improvements also improve underlying systems by allowing for dynamic alteration and implementation of generated code with increased speed and frequency.

Figure 2:
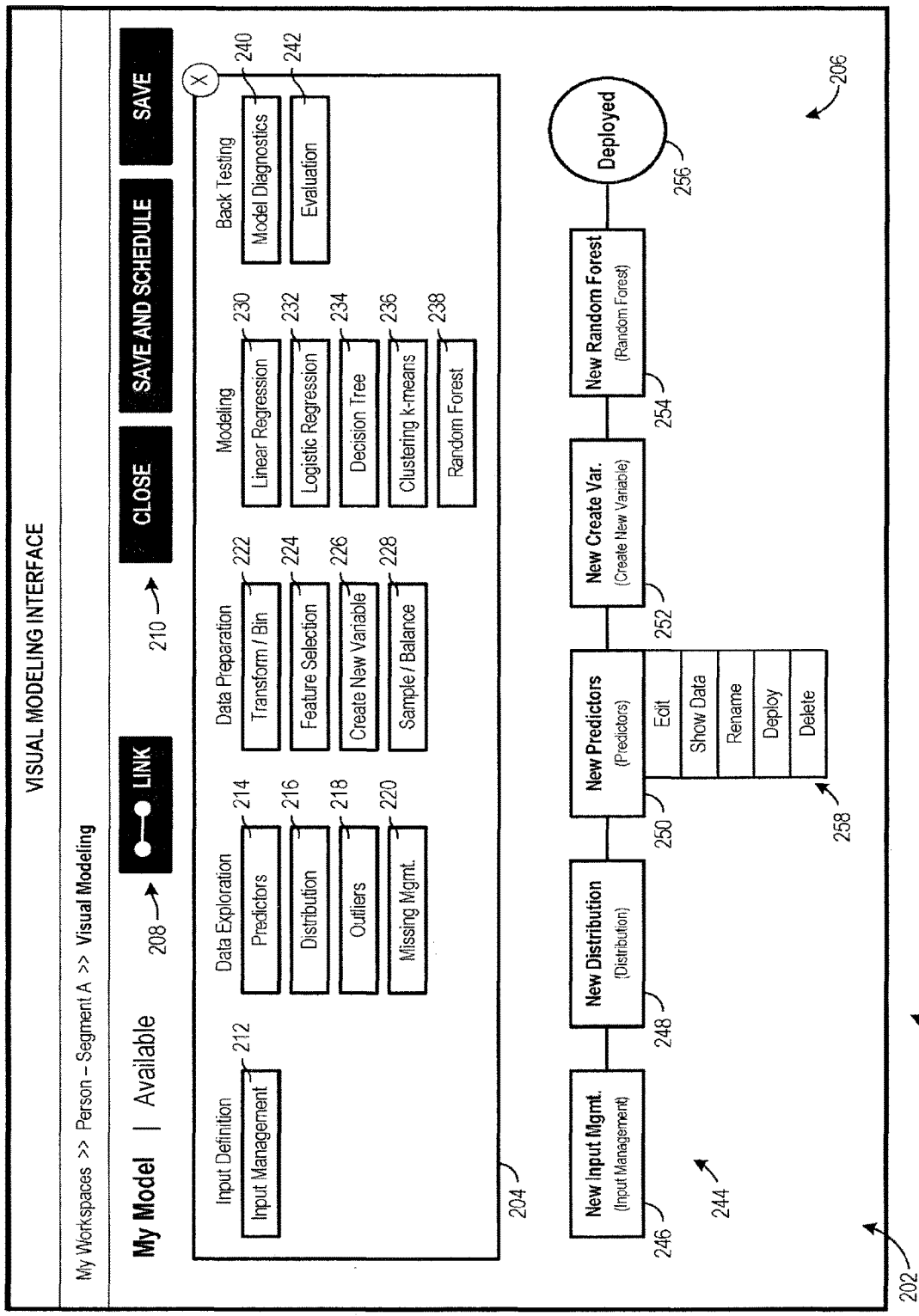
FIG. 2 shows an example graphical user interface as may be provided by the system of FIG. 1.

Turning to FIG. 2, an example graphical user interface (GUI) 200 is illustrated. The GUI 200 may be generated by the graphical user interface circuitry 105 and may be displayed on a display of a computing device that provides the visual modeling tool 100 or a computing device that is connected to a server providing the visual modeling tool 100. The GUI 200 includes a visual distributed computing design workspace 202 that facilitates graphically designing and altering data models or other distributed computing applications. The visual distributed computing design workspace 202 includes a node palette 204, a digital canvas 206, a linking tool 208, and control buttons 210. Example control buttons include "close," which may close the visual distributed computing design workspace 202 or an open model, "save and schedule" which may save progress on the open model and may schedule deployment of the model on the target distributed computing cluster 116, and "save," which may simply save progress on the open model.

The node palette 204 includes a plurality of individually selectable nodes, each of which includes a graphical representation (e.g., a title, a color, a shape, an image, etc.) and corresponds to a different distributed computing function that is available on the pre-determined target distributed computing cluster 116. When interacting with the GUI 200, a user may select a node in the node palette 204 for inclusion within the digital canvas 206. For example, the GUI 200 may provide a user with the ability to click or select and "drag" the desired node to the digital canvas 206. Alternatively, a user may simply click or select a single node or multiple nodes, which may cause the GUI 200 to automatically populate the digital canvas 206 with the selected node or nodes. Alternatively, a user may right-click or alt-select a node, which may cause the GUI 200 to provide a menu having a selectable option to add the node to the digital canvas 206. In another approach, the GUI 200 may enable a user to highlight or select one or more nodes within the node palette 204 and may provide a button or other selector to populate the digital canvas 206 with the selected node or nodes. The GUI 200 may enable users to move the nodes to desired locations on the digital canvas 206 and to update their visual positions on the digital canvas 206 as needed during development of the model. In response to a user interacting with the GUI 200 to select and place a node on the digital canvas 206, the visual modeling circuitry 104 accepts the node selection of that specific node from the node palette 204 and places the specific node on the digital canvas 206 within the GUI 200.

The visual distributed computing design workspace 202 may also include a linking tool 208, such as a pointer, a line tool, or another graphical linking device to establish links between nodes placed in the digital canvas 206. For example, the GUI 200 may enable a user to select the linking tool 208 and then draw connections between nodes, thereby linking the output of one node to the input of another node. For example, the example model 244 shown on the digital canvas 206 includes links from the first node 246 to the second node 248, from the second node 248 to the third node 250, and so forth. The graphical linking pattern establishes that the output of the first node 246 is provided to the input of the second node 248, the output of the second node 248 is provided to the input of the third node 250, and so forth. Generally, in one example, the workflow amongst the linked nodes within the digital canvas 206 proceeds from left to right. In this approach, a node will feed data into a next linked node to its right. Stated another way, the right side of a node may be considered that node's output, while the left side of the node may be considered its input. Variations in node interconnection and representation are possible.

Each node can be linked to zero, one, or more than one other node. Although the example model 244 is shown as a single string of nodes, in other approaches an output of one node can be linked to the input of more than one node, for example, to create multiple different branches within the model that may utilize data generated or output by a certain node. For example, a new node could be added to the example model 244 on the digital canvas 206 that may receive the output of the third node 250, while the fourth node 252 may continue to also receive the output of the third node 250. In this manner, multiple parallel branches can be created from any of the nodes within the digital canvas 206. In response to a user interacting with the GUI 200 to establish connections between nodes on the digital canvas 206, the visual modeling circuitry 104 accepts the linking selections comprising dataflow connections between the nodes and links the specific nodes as specified by the linking selections. The graphical user interface circuitry 105 generates a graphic representation of the linking via the GUI 200.

In one approach, the node palette 204 may group the nodes by distributed computing function. For example, as is shown in FIG. 2, the node palette 204 shows the nodes grouped into five different groupings, including Input Definition, Data Exploration, Data Preparation, Modeling, and Back Testing, each named according to their function. Each node may include one or many functions of an analytical modeling run time environment, e.g., functions available in a Spark run time environment, or other run time environments. Developers can alter or generate new nodes that include new or different analytical modeling run time environment functions.

Within the Input Definition category in the node palette 204, an Input Management node 212 is selectable, which marks the beginning of the flow of data through a model and retrieves data from a data source. The Input Management node 212 functionality may enable a user to visualize the data and offer a starting point for the workflow of the data model as the context in which the data model works. In this way, any model that a user builds can be ready to be operationalized in production without having to worry about the consistency of data structures between a training dataset and the actual production data.

Within the Data Exploration category in the node palette 204, a Predictors node 214, a Distribution node 216, an Outliers node 218, and a Missing Management node 220 are each selectable. The Predictors node 214 selects which input variables should be copied to its output. The Distribution node 216 enables the user to explore variable distribution, define filters, or create flag variables according to defined conditions within a model. The Outliers node 218 defines a remediation actions for outliers and extreme values in continuous variables (e.g., defined in terms of distance from the mean value). Examples of such actions include: None, Force, Cut records, and Nullify values. The Missing Management node 220 defines a remediation for missing values, which may vary by variable type. Such actions may include: None, Mean, Value, Random, Median, Constant value, or others.

Within the Data Preparation category in the node palette 204, a Transformation/Bin node 222, a Feature Selection node 224, a Create New Variable node 226, and a Sample/Balance node 228 are each selectable. The Transformation/Bin node 222 modifies the shapes of distribution of numerical (e.g., continuous) variables either by applying numerical transformations or binning techniques. The Feature Selection node 224 screens variables by looking for structural problems in the fields as well as taking statistical tests of significance of the dependency between each predictor and the target variable, and allows the user set what variables to keep. The Create New Variable node 226 creates a new variable and adds it to the stream. The user can write a formula defining the variable's value. The Sample/Balance node 228 computes a random sampling of the data by specifying an inclusion probability for each record. A user may also select different inclusion probabilities for "true" and "false" target variable records, in order to balance the data for modelling.

Within the Modeling category in the node palette 204, multiple different modeling nodes are selectable. Each modeling node represents a different modeling or prediction algorithm or technique. The modeling nodes create a variable consisting in a prediction score based on the input variables. The predictions are computed using a machine learning or statistical model. A model's behavior can be changed by means of the various parameters that appear inside the node's page. The example modeling nodes, which names correspond to their associated algorithm or technique, include a Linear Regression node 230, a Logistic Regression 232, and Decision Trees (e.g., CHAID) node 234, a Clustering k-means node 236, and a Random Forest node 238. Other types of modeling nodes may be possible, and may vary according to the functions provided by a particular target distributed computing cluster.

Within the Back Testing category in the node palette 204, a Model Diagnostics node 240 and an Evaluation node 242 are selectable. The Model Diagnostics node 240 may diagnose issues with a developed model. The Evaluation node 242 shows performance charts based on the Training and Test data set for one or more scores available in the model workflow in order to compare them at different percentiles.

The GUI 200 may provide a node action selector menu 258 that may be accessed for each node on the digital canvas 206. For example, a user may select a node, such as the third node 250, and select an action for that node. The user may select the node by right or left clicking the node, hovering above the node, touching the node, circling the node, or any other known methods of selecting an item or activating a menu associated with an item within a graphical user interface. The user may select the particular action by selecting or clicking on the desired action within the node action selector menu 258. The node action selector menu 258 may be populated with actions available for the specific nodes (e.g., the nodes in the example model 244) on the digital canvas 206. Various possible actions include an edit action to change a node configuration. The edit action causes the GUI 200 to present information regarding the settings of the node (see FIG. 3) and allow the user to change its configuration thereby changing the node's behavior. A show data action causes the GUI 200 to provide to a user a visualization of the data flowing out of a specific node. A rename action causes the GUI 200 to rename the node. A deploy action causes the visual modeling circuitry 104 to deploy the node on the target distributed computing cluster 116. The deploy action causes the visual modeling circuitry 104 to select a path from the current node to the beginning of the data model for deployment and concatenates the flows of the nodes within the path to define the behavior of the overall model. The deploy action also causes the visual modeling circuitry 104 to extract the code of the nodes of the so-called "gem" model, and causes the model file building circuitry 110 to create a deployment package (e.g., including a JAR file) containing the extracted code that implements the selected "gem" data model. A run action causes the visual modeling circuitry 104 to perform an action with the interactive session server 108 pertaining to the node or the model. For example, this run action may appear inside a settings screen for a node (see FIG. 3) to enable interaction with the interactive session server 108 to run the model or the node on the interactive session server 108. Examples of such nodes are the modeling type nodes (e.g., Random Forest, Linear Regression, etc.), in which case executing a run command may train the model and produce sample predictions. A delete action may cause the visual modeling circuitry 104 to delete the node from the digital canvas 206 and from the model. Other actions are possible.

Figure 3:
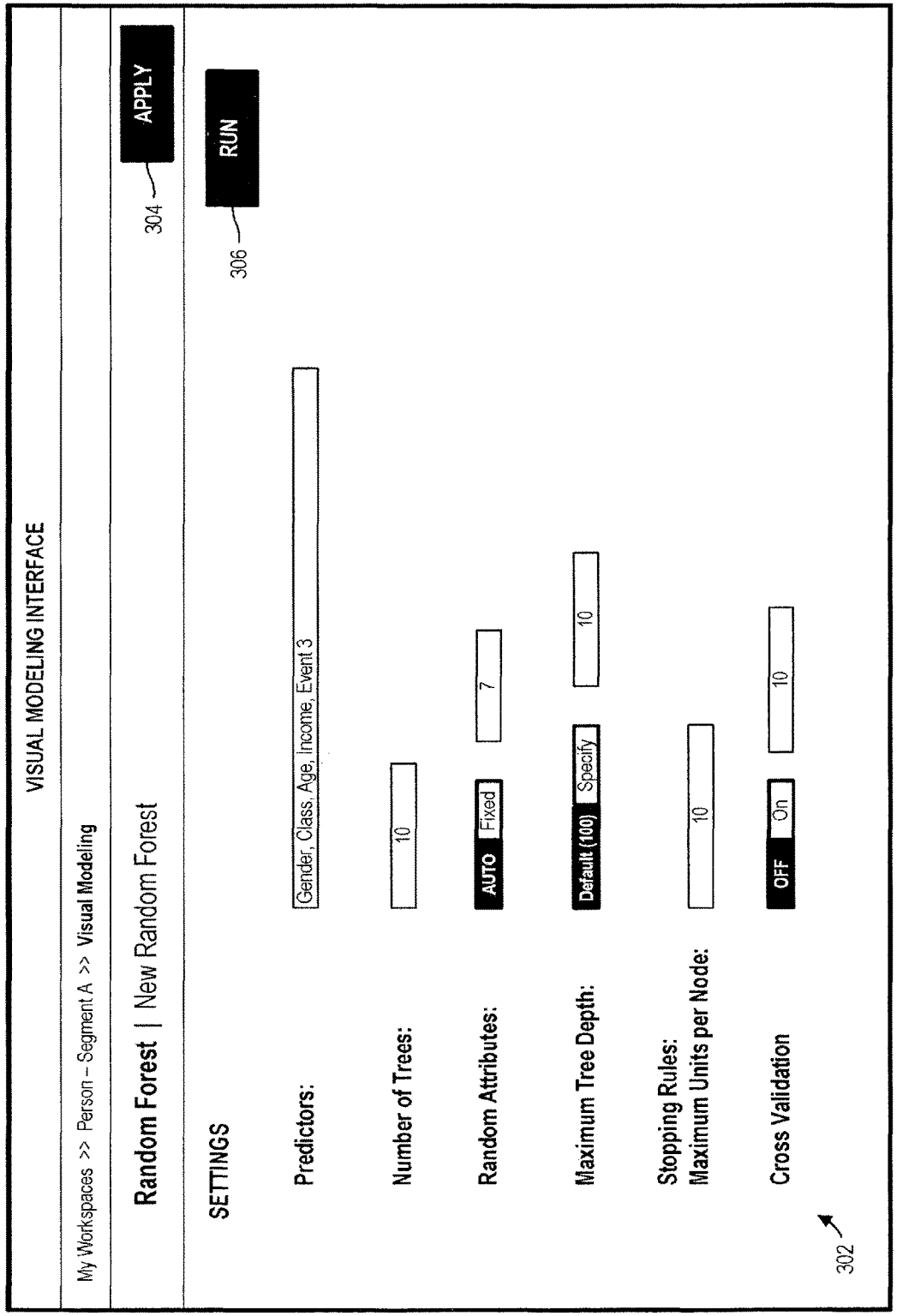
FIG. 3 shows another example graphical user interface as may be provided by the system of FIG. 1.

FIG. 3 illustrates an edit settings GUI 300 for a node (the fifth node 254, in this example). A user may click on the "edit" action within the menu 258 and the graphical user interface circuitry 105 will then display the edit settings GUI 300 for the selected node. In this example (a random forest type node), the edit settings GUI 300 shows a plurality of settings 302 particular to that node which the user can manipulate. Each node may have a different set of settings that can be altered according to the functionality of the particular node. The edit settings GUI 300 may include an "apply" command button (and/or a "save" or "close" command button) to apply change to the settings 302 for the node and to exit the edit settings GUI 300 and return to the digital canvas 206 of the GUI 200. If the node is a modeling node, a "run" command button 306 may be provided to train or run the model with data (e.g., training data specified in an input management type node earlier in the model chain). Different nodes will have different settings pages with different settings or commands specific to the function of that particular node. Some or all nodes may include many features, settings, or parameters that can be selected or altered, for example, in a visual manner, e.g., via drop down menus, selections, radio buttons, text entries, switches, or other graphical interface elements. The node settings may include default settings that are provided when a node is first initiated or instantiated. These alterations then cause the visual modeling circuitry 104 to change the functional code that the visual modeling circuitry 104 creates for execution on the interactive session server 108 or the target distributed computing cluster 116.

In one approach, the visual modeling circuitry 104 and the graphical user interface circuitry 105 may provide the GUI 200 using a page-based architecture, for example, for use within a page-based design application such as Accenture Insight Platform (RIP) Design Studio (DS). The GUI 200, and individual nodes within the GUI 200, may be composed as a set of pages within the AIP DS. Every page's logic in AIP DS is governed by a set of three pieces of logic, written in AIP DS's own configuration language (e.g., Formula Language), and the logic can each be defined and changed at run-time. Each page includes a presenter element, a handler element, and a router element. The presenter element defines the page's contents in terms of widgets, which are re-usable elements of the user interface. The presenter element also dictates the visual aspects of the page. The handler element updates the page and carries out business logic in terms of what happens on the page (e.g., events). Much of the logic for the pages may be dictated or provided by the application logic 102 of the visual modeling tool 100. The router element decides whether to navigate to another page, the destination page, and the destination page's context based on the events that happen within the current page.

The main page of the GUI 200 is a digital canvas page that handles the presentation and interaction with the digital canvas 206 by a user. This main page is shown in FIG. 2. Each individual node placed on the digital canvas 206 is represented by a different page. A user can select and view a node's page by clicking the "edit" button in the node action selector menu 258 for the node, double clicking the node, selecting the node, or by other known methods to select and open an item. As shown above in FIG. 3, a page for the fifth node 254 is shown.

Navigation between the pages is handled by the router element of the page. The router element for the main digital canvas page can be changed during run time based on events that occur in the main digital canvas page. For example, as a node is added to the digital canvas 206 of the main digital canvas page, the router for the digital canvas page is edited to add a navigation route to enable a user to navigate to the page for the new node in response to the event of a user selecting that node for editing. In a similar approach, most, if not all of the pages for the nodes will have router elements that route back to the main digital canvas page in response to a user exiting the individual node edit pages by pressing the "Apply" command button 304.

The architecture of the visual modeling tool 100 may be regarded as comprising two layers: a node layer and a development layer. The node layer corresponds to the operation and interoperation of the nodes within the digital canvas 206. For example, a template code structure can be provided for each node to provide the functionality and interoperability of the various nodes. The development layer exists within the framework of the first conceptual layer to provide the functional blocks necessary to enable interactive development of the model using the interactive session server 108 and to enable deployment of the model on the target distributed computing cluster. This enables scalability and extensibility of the visual modeling tool 100 by addition of further modular nodes within the framework. By utilizing the AIP DS environment, developers can design new pages and new nodes in a modular fashion such that the number of types of nodes available as part of the visual modeling tool 100 can increase as the number of functions increases with a particular target distributed computing cluster 116.

Each node provides a visual representation of a function of the target distributed computing cluster 116. Each node may represent a portion of functional code created or generated by the visual modeling circuitry 104 in response to development of the model in the digital canvas 206. That is to say, each node represents a portion of functional code generated by the visual modeling circuitry 104 and used to implement the model on the interactive session server 108 or the target distributed computing cluster 116.

In one example, each node may adhere to a node template code structure. The particular functional code executed by the target distributed computing cluster 116 that each node represents or implements will vary between node types. However, the node template code structure provides a rubric for operation of each node and for interoperability of each node within the visual modeling tool 100. An example pseudocode representation of the node template code structure during development of a model is provided below:

```
Function CODE:
    if (CONFIG.inputNode != Nil)
        CONFIG.inputNode.CODE( ) + CONFIG.code
    else
        CONFIG.code
Function SHOW_DATA:
    SPARK(CODE( ) + '.show( )')
Data structure CONFIG:
    inputNode: <<Injected by the VM framework>>
    code: <<Every node has its specific functional code
    to be implemented on the target distributed
    computing cluster>>
```

The example node template code structure describes operation of each node when developing a model using the visual modeling tool 100 via the GUI 200, for example, when interacting with the interactive session server 108. It describes a recursive approach to node interlinking, wherein the input of a given node is defined as the "CODE" (e.g., the distributed computing environment functional code) for the node before it in a model node chain. The "inputNode" variable is injected for each node by the visual modeling circuitry 104 (e.g., operating a virtual machine framework) according to how the nodes are arranged and interconnected within the digital canvas 206 of the GUI 200. As shown above, if a given node is the first node in a model node chain (e.g., a node type "Input Management"), then it will not have an input "CODE" to prepend to the front of its own CONFIG.code. However, if a given node does have an input node, then the visual modeling circuitry 104 will prepend the previous node's "CODE" (which may also recursively include "CODE" for additional nodes before that node) to its own CONFIG.code.

The "SHOW_DATA" function for a node can be initiated for any node within a node chain in the digital canvas 206 during the interactive development phase of the model. For example, as is shown in FIG. 2, the third node 250 of the example model 244 includes the node action selector menu 258, from which a user can select the command "show data," which will initiate the node's "SHOW_DATA" function. In response, the visual modeling circuitry 104, through the GUI 200, will provide the output data generated by execution of the functional distributed computing cluster code on the interactive session server 108 for the particular node (e.g., the third node 250) and its previous nodes (e.g., the second node 248 and the first node 246). The GUI 200 may provide the output data for the node in a pop-up window or frame, for example.

As is shown in the node template code structure pseudo-code example above, the function "SHOW_DATA" causes the visual modeling circuitry 104 to generate a command to the interactive session server 108, via the interactive session client circuitry 106, to execute the functional code ("CODE( )") for the particular node (e.g., the third node 250) and its previous nodes (e.g., the second node 248 and the first node 246) plus a ".show( )" command. For example, when show data is selected for the third node 250, the visual modeling circuitry 104 concatenates the functional code for the first, second, and third nodes 246-248 into the following example functional pseudocode:

```
SPARK(val data = sqlContext.
    parquetFile("hdfs://customer_SUBSET") //node 1
    .filter(r => r.getString("first").equals("foo")) //node 2
    .map(r => (r._1, r._3)) //node 3
    .show( ) //show the data
)
```

The visual modeling circuitry 104 issues the command (e.g., the "SPARK" command) to the interactive session server 108, via the interactive session client circuitry 106, to execute the provided functional code and return the resulting data. In response, the visual modeling circuitry 104 will receive results from execution of the code from the interactive session server 108, via the interactive session client circuitry 106, and will populate a show data pop-up window with all or some of the resulting returned data via the GUI 200.

In another example, during the interactive development phase of the example model 244, the fifth node 254 may have additional considerations with respect to its functional code that may influence how it is implemented within the visual modeling tool 100. This is because the fifth node 254 is a modeling node type (e.g., Random Forest) that requires training prior to implementation. If the fifth node 254 has not yet been trained, its functional code may be empty or null. Thus, if a user executes a "show data" command on the fifth node 254, the visual modeling circuitry 104 will merely replicate the data received into the fifth node 254 from the fourth node 252 as the show data output. For example, the "SPARK" command issued to the interactive session server 108 will only include functional code for the first through fourth nodes 246-252.

To train the fifth node 254, the user may select the "Run" command button 306 in the edit settings GUI 300 of the fifth node, as shown in FIG. 3. The user will have already selected the training data within the settings view for the first node 246, being an Input Management node type. The training data is indicated as "hdfs://customer_SUBSET" in the example below. An example of functional pseudocode for training a modeling node associated with the fifth node 254 is provided below:

```
val data = CONFIG.inputNode.CODE( ) //functional code for
    previous nodes, injected by visual modeling circuity
val splits = data.randomSplit(Array(07, 03))
val (trainingData, testData) = (splits(0), splits(1))
val model = RandomForest.trainClassifier(trainingData,
    uiParams)
val labelAndPreds = testData.map {point => val prediction
    = model.predict(point.features) (point.label,
    prediction)}
```

This example functional pseudocode may not be populated within the fifth node 254 until it is trained. Alternatively, the functional pseudocode exists within the fifth node 254, but an additional flag may exist within the node to indicate whether the modeling type node is trained or not. Once the "Run" command button 306 is selected, the visual modeling circuitry 104 may generate and issue a command to the interactive session server 108 to train the model. Example functional pseudocode for such a training command is provided below:

```
SPARK(val data = sqlContext.
    parquetFile("hdfs://customer_SUBSET") //node 1
    .filter(r => r.getString("first").equals("foo")) //node 2
    .map(r => (r._1, r._3)) //node 3
    .map(r => (..., f(r)) )//node 4
    val splits = data.randomSplit(Array(07, 03)) //node 5
    val (trainingData, testData) = (splits(0), splits(1))
    val model = RandomForest.trainClassifier(trainingData,
        uiParams)
    val labelAndPreds = testData.map {point => val prediction
        = model.predict(point.features) (point.label,
        prediction)}
    .show( ) //show the data
)
```

The interactive session server 108, and more specifically, the particular assigned interactive session instance 119, will train the example model 244 using the training data specified and will return the training results. After the fifth node 254 (e.g., a modeling type node) is trained, the visual modeling circuitry 104 may mark it as trained by saving the trained model as a "model" variable within the assigned interactive session instance 119 and by setting a training flag within the node. Once the model is trained, example pseudocode for the example fifth node 254 becomes as follows:

.map(r=>model.predict(point.features))//node 5

If a user initiates a "show data" command for the fifth node 254, the visual modeling circuitry 104 can issue commands to the interactive session server 108 via the interactive session client circuitry 106 to run the trained model on the interactive session server 108 using the trained model code. Example pseudocode to run the trained model on the interactive session server 108 (e.g., using the "show data" command) is as follows:

```
SPARK(val data = sqlContext.
    parquetFile("hdfs://customer_SUBSET") //node 1
    .filter(r => r.getString("first").equals("foo")) //node 2
    .map(r => (r._1, r._3)) //node 3
    .map (r => (..., f(r)) )//node 4
    .map(r => model.predict(point.features))//node 5
    .show( ) //show the data
)
```

A user can then verify that the results of the trained model on specified input data are acceptable. Alternatively, the user can alter parameters or settings for any of the nodes within the example model 244 and iteratively retrain and retest the example model 244 on the interactive session server 108. Because the example model 244 is executed on the interactive session server 108, training and execution of the example model 244 is much quicker than deployment on the larger target distributed computing cluster 116. In this manner, the user may be provided with results very quickly, making interacting and editing the example model 244 appear to occur quickly, and in real-time in some instances.

In one approach, the visual modeling tool 100 may implement a "stateful" interactive session on the interactive session server 108 during the interactive model development phase. The interactive session is "stateful" in that the visual modeling circuitry 104 keeps track of the state of the nodes within the interactive session to avoid computing the same value more than once. Instead of recursively concatenating and executing the code from all of the nodes within a model node chain repeatedly every time an alteration is made to one of the nodes, each node defines a variable for saving the output values for that particular node. An example pseudocode representation of the node template code structure during a stateful interactive development session is provided below:

```
Function ENSURE_VAR_DEFINED:
    if (CONFIG.varDefined == false) {
        if (CONFIG.inputNode != Nil) {
            CONFIG.inputNode.ENSURE_VAR_DEFINED( )
            SPARK('val ' + CONFIG.id + ' = '
                + CONFIG.inputNode.id
                + '.' + CONFIG.code)
        } else {
            SPARK('val ' + CONFIG.id + ' = '
                + CONFIG.code)
        }
        CONFIG.varDefined = true
    }
Function SHOW_DATA:
    ENSURE_VAR_DEFINED( )
    SPARK(CONFIG.id + '.show( )')
```

For example, the first time "show data" is executed on the fifth node 254 (after it is trained) during the interactive model development phase using the interactive session server 108, the visual modeling circuitry 104 will generate code to create variables within the interactive session server 108 corresponding to the output of each node. Example pseudocode is as follows:

```
SPARK(val n1 = sqlContext.
    parquetFile("hdfs://customer_SUBSET") //node 1
    val n2 = n1.filter(r =>
    r.getString("first").equals("foo")) //node 2
    val n3 = n2.map(r => (r._1, r._3)) //node 3
    val n4 = n3.map(r => (..., f(r)) )//node 4
    val n5 = n4.map(r => model.predict(point.features))//node
    5
    n5.show( ) //show the data
)
```

The visual modeling circuitry 104, upon executing a node for the first time, will set the "CONFIG.varDefined" flag to true within the node, indicating that the node has already been processed. Thus, upon executing a show data command for a node for a second time (without changing any settings of the node or the nodes prior to it in the chain), example pseudocode will simply yield:

n5.show( ) //show the previously-processed data

However, if a user entered the third node 250 in the example model 244 within the GUI 200 and changed a setting, the visual modeling circuitry 104 would set the "CONFIG.varDefined" flag to false for the third node 250 and the nodes that also receive the output data from the third node 250 (e.g., the fourth node 252 and the fifth node 254). However, because the nodes prior to the third node (e.g., the first node 246 and the second node 248) were not altered, their stored output values stored in variables "n1" and "n2" remain unchanged. Thus, in this example, the example pseudocode would be as follows:

```
SPARK(val n3 = n2.map(r => (r._1, r._3)) //node 3
val n4 = n3.map(r => (..., f(r)) )//node 4
val n5 = n4.map(r => model.predict(point.features))//node
    5
n5.show( ) //show the data
)
```

By leveraging a stateful interactive session, overall processing by the interactive session server 108 is reduced as the interactive session server 108 can make use of previously calculated data for each node. This improves the speed of the interactive session, thereby reducing time wasted when developing and testing models.

Once a user is satisfied with the trained model, the user may command the visual modeling tool 100 to deploy the model on the target distributed computing cluster 116. Prior to deployment of this "gem" model on the target distributed computing cluster 116, the visual modeling circuitry 104 may save the trained model, for example, in a memory or a networked storage location. Example pseudocode for saving the trained model may be as follows:

```
val splits = data.randomSplit(Array(07, 03)) //node 5
val (trainingData, testData) = (splits(0), splits(1))
val model = RandomForest.trainClassifier(trainingData,
    uiParams)
model.save(sc, "hdfs://randomforest42")
```

In the GUI 200, the graphical user interface circuitry 105 may display or provide a "deployed" indicator 256 connected to the particular node representing the last node in the deployed model.

The Deploy action triggers the visual modeling circuitry 104 to extract the "gem" (the "gem" being the developed model that the user has determined satisfies their needs). Deployment triggers creation of the deployment package 112 (e.g., a JAR file) by the model file building circuitry 110 for deployment on the target distributed computing cluster 116 via the model deployment circuitry 114. The model file building circuitry 110 may extract or compile the code for the data model that is specific for the particular predetermined target distributed computing cluster. The visual modeling circuitry 104 and the model file building circuitry 110 extract the functional code for the deployment package from every node, starting from the selected node (e.g., the fifth node 254) and going backwards, ending on the initial node (e.g., the first node 246, Input Management). For example, the visual modeling circuitry 104 may select a path from the chosen node to a pre-determined starting point node (e.g., a input management type node), which path will include a set of nodes. The visual modeling circuitry 104 may then designate the path as a behavioral representation of the overall model for the set of nodes on the established path. This works the same as the recursive extraction of code discussed above with the "show data" examples, but causes the visual modeling circuitry 104 to extract different code for every node. For example, the first node 246, being an input management type node, will select only a subset of the data for the interactive development stage executed on the interactive session server 108. However, the the first node 246 will specify to use all the required data (e.g., a stream of data) for the model once deployed on the target distributed computing cluster 116. An example pseudocode representation of the node template code structure for deployment of a model is provided below:

```
Function GEM_CODE:
if (CONFIG.inputNode != Nil)
    CONFIG.inputNode.GEM_CODE( ) + CONFIG.gemCode
else
    CONFIG.gemCode
```

The "gemCode" represents the functional code that is used for deployment of the model on the target distributed computing cluster 116 during deployment. The "gemCode" may be the same as or different from the "code" discussed above for execution of the model on the interactive session server 108 during the interactive development phase. Thus all or some nodes may have different functional code for each execution environment. This difference can be seen by comparing the following example "gem" functional pseudocode with the example functional pseudocode discussed above with respect to training the model.

The visual modeling circuitry 104 extracts and concatenates the "gem" version of the functional code for each node in succession. The following example "gem" functional pseudocode illustrates the "gem" code generated for deployment on the target distributed computing cluster 116:

```
val data = sqlContext.
    parquetFile("hdfs://customer_ALL") //node 1
    .filter(r => r.getString("first").equals("foo")) //node 2
    .map(r => (r._1, r._3)) //node 3
    .map(r => (..., f(r)) )//node 4
val model = RandomForestModel.load(sc,
    "hdfs://randomforest42") //node 5 (trained model)
val labelAndPreds = testData.map (point => val prediction
    = model.predict(point.features) (point.label,
    prediction)}
```

Once the code (e.g., execution code for the target distributed computing cluster 116) is extracted from each node and compiled or concatenated, the model file building circuitry 110 packages the extracted code and any other variables, data, commands, libraries, as needed, into a deployment package 112. The model deployment circuitry 114 can then deploy that deployment package 112 to the target distributed computing cluster 116 for execution on the target distributed computing cluster 116. The model deployment circuitry 114 can provide commands over a network to interact with the target distributed computing cluster 116 to upload the deployment package 112, to execute the model of the deployment package 112, to schedule execution of the model of the deployment package 112, to specify data or data streams on which the model of the deployment package 112 is to be executed, to halt execution of a model of the deployment package 112, to receive data from or status regarding the execution of the model, or to perform other interactions with the target distributed computing cluster 116. The model deployment circuitry 114 can communicate with the visual modeling circuitry 104 to provide results to a user via the graphical user interface circuitry 105 or to store the results or portions of the results within a memory or database.

Returning to FIG. 1, the visual modeling tool 100 may include interactive session client circuitry 106 to interface with the interactive session server 108. As mentioned above, the interactive session client circuitry 106 can communicate with the interactive session server 108 via a network or via internal busses if co-located on a single computer. For example, when a session begins within the visual modeling tool 100, or when otherwise commanded to do so within the GUI, the interactive session client circuitry 106 may communicate with the interactive session manager 118 of the interactive session server 108 to request creation of a unique interactive session instance (e.g., first interactive session instance 120). The interactive session manager 118 may create the first interactive session instance 120 in the interactive session server 108 and may communicate an address of the first interactive session instance 120 back to the interactive session client circuitry 106. As a model is developed, loaded, run in the visual modeling circuitry 104 via the graphical user interface circuitry 105 (discussed below), the interactive session client circuitry 106 can communicate directly with the first interactive session instance 120 to provide code representing the model, provide operational instructions for execution of the model, and receive data or results from execution of the model. For example, the interactive session client circuitry 106 may use the provided address for the first interactive session instance 120 to communicate directly with the first interactive session instance 120 via the REST over HTTP API. Alternatively, the interactive session client circuitry 106 may communicate with the first interactive session instance 120 via the interactive session manager 118, e.g., using the REST over HTTP API.

Once a user is satisfied with a model, the user can deploy the model on a predetermined target distributed computing cluster 116. The model file building circuitry 110 compiles the code from various nodes shown on the GUI to create a deployment package 112. For example, the model file building circuitry 110 may receive Scala code, Python code, or Java code represented by each node and can responsively compile the code, the necessary resources, values, or any required libraries into a JAR file suitable for deployment within the predetermined target distributed computing cluster 116. In one approach, the model file building circuitry 110 includes a JAR Builder Microservice (JBM) to package the trained model and all required data, coefficients, and code, into an executable file, such as an executable JAR file. An example of deployable code is provided below:

```
import org.apache.spark.mllib.linalg._
import org.apache.spark.mllib.regression._
import org.apache.spark.mllib.tree.Randomforest
import org.apache.spark.sql.SQLContext
import org.apache.spark.{SparkConf, SparkContext}
object RandomForestParquetExample {
    def main(args: Array[String]) {
       val sparkConf = new SparkConf( ).setAppName
("RandomForestParquetExample")
       val sc = new SparkContext(sparkConf)
       val sqlContext = new SQLContext(sc)
       val vmTable = sqlContext.parquetFile(args(0))
       vmTable.registerTempTable("vmTable")
       val sqlDataFrame = sqlContext.sql("select VEH_NO, TARGET
from vmTable")
       val data = sqlDataFrame.rdd.map(row => new LabeledPoint(
          row.get(1).asInstanceOf[java.math.BigDecimal].doubleValue,
          Vectors.dense(
             new java.math.BigDecimal(row.get(0).asInstanceOf[String]).-
doubleValue
          )
       ))
       val splits = data.randomSplit(Array(0.9, 0.1))
       val (trainingData, testData) = splits(0), splits(1))
       val numClasses = 2
       val categoricalFeaturesInfo = Map(0 -> 32)
       val numTrees = 10
       val featureSubsetStrategy = "auto"
       val impurity = "gini"
       val maxDepth = 10
       val maxBins = 32
       val model = RandomForest.trainClassifier(trainingData, numClasses,
```

-continued

```
categoricalFeaturesInfo,
        numTrees, featureSubsetStrategy, impurity, maxDepth, maxBins)
     val labelAndPreds = testData.map { point =>
        val prediction = model.predict(point.features)
        (point.label, prediction)
     }
     val testErr = labelAndPreds.filter(r =>
r._1 != r._2).count.toDouble / testData.count( )
        println("Test Error = " + testErr)
        println("Learned classification forest model:\n" +
model.toDebugString)
    }
}
```

The model deployment circuitry 114 communicates with the target distributed computing cluster 116, over a network for example, to provide the target distributed computing cluster 116 with the deployment package 112, and any necessary instructions regarding execution or scheduled execution of the model or models contained within the deployment package 112 on the target distributed computing cluster 116. The model deployment circuitry 114 can also receive data from the target distributed computing cluster 116, such as results from execution of the model or a present status of the model.

Once a user places and interconnects nodes on the visual modeling canvas to create an analytical modeling process, the visual modeling tool generates code, e.g., in the Scala programming language or another programming language, corresponding to each node and to the collection of interconnected nodes. In one approach, the visual modeling tool generates code by traversing the nodes one by one, for example, from an input source toward a last node in the series, which may be represented from left to right or top to bottom, in various examples. For example, when generating code, the visual modeling tool may define branches of the workflow, associate each node with its intended or representational function, take an input from a previous node (if present), and use inputs or settings a user has provided. In this manner, the visual modeling tool may generate code in a similar way as data may progress through the analytical modeling process.

A user can cause the visual modeling tool 100 to train an analytical model. For example, in a Spark application setting, the user can cause the visual modeling tool to interact with a Spark Interactive Server (e.g., utilizing Spark in-memory features) to train the analytical model with data the user may provide or designate. The user may cause the visual modeling tool to alter one or more values or features of the analytical model and retrain the analytical model iteratively. Once the user is satisfied with the results of the trained model, the user can cause the visual modeling tool 100 to create a different code output that is suitable for deployment on an analytical modeling run time environment (e.g., a Spark cluster). For example, the user may select or connect a Deployment Node to the analytical modeling process to cause the visual modeling tool to create deployable code and to deploy the analytical model.

The visual modeling tool 100 can generate different code outputs dependent upon the status of the analytical model or the progress through the analytical modeling process. For example, while an analytical model is being initially generated and trained, the visual modeling tool may generate a first code that is suitable for interaction with an Interactive Session Server 108 (e.g., a Spark Interactive Server) that allows for quick and interactive creation and training of models on smaller subsets of data (e.g., training data).

However, once the analytical model is ready for deployment on the target distributed computing cluster 116 (e.g., a Spark cluster), the visual modeling circuitry 104 can generate different code that is suitable for deployment on that run time environment. Examples are provided and discussed below.

The visual modeling tool may also include error checking circuitry which may perform error checking or validation on the various inputs or the generated code. For example, the error checking circuitry may perform semantic checks on generated code, catch and process errors returned from the interactive session server 108 or the distributed computing cluster 116. The error checking circuitry may also perform error checking on user settings or configurations of an analytical model as created in the visual modeling tool 100 by a user. For example, the error checking circuitry may determine whether certain nodes are missing inputs.

The visual modeling tool 100 may also provide multi-tenant functionality. For example, the visual modeling tool 100 may enable many users to manage and access sets of data and libraries of analytical models centrally rather than distrusted across many individual separate devices. The visual modeling tool 100 can also provide version control for sets of data and analytical models, for example, ensuring that central data that is accessed by many users is not corrupted or altered to the detriment of another user or session. For example, the visual modeling tool 100 may provide isolation of the interactive sessions instances 119 (e.g., interactive session instances 120 and 122 on interactive session server 108) and for multiple users to simultaneously or non-simultaneously interact with and access data or analytical models without interfering with other sessions.

Expressed another way, the system architecture may include graphical user interface circuitry 105 configured to generate a graphical user interface 200 of a visual distributed computing design workspace 202. The visual distributed computing design workspace 202 includes: a node palette 204 comprising individually selectable nodes, each with a graphical representation and corresponding to a distributed computing function available on a pre-determined target distributed computing cluster 116, a linking tool 208 for establishing connection links between the individually selectable nodes, and a digital canvas 206. The system architecture may also include visual modeling circuitry 104 responsive to interactions with the graphical user interface 200 to facilitate visually building a data model. The visual modeling circuitry 104 is configured to accept node selections of specific nodes from the node palette 204, place the specific nodes on the digital canvas 206, accept linking selections of dataflow connections between the specific nodes, and link the specific nodes as specified by the linking selections.

The system architecture may further include model file building circuitry 110 operable to generate distributed computing execution code for the data model and specific to the pre-determined target distributed computing cluster 116, package the distributed computing execution code into a deployment package 112, and deploy the deployment package 112 to the pre-determined target distributed computing cluster 116. Within the system architecture, interactive session client circuitry 106 is configured to spawn a dedicated distributed computing session (e.g., interactive session instances 119) to isolate execution of the data model, and after execution of the data model on the interactive session server 108, present execution results for the data model within the dedicated distributed computing session.

Figure 4:
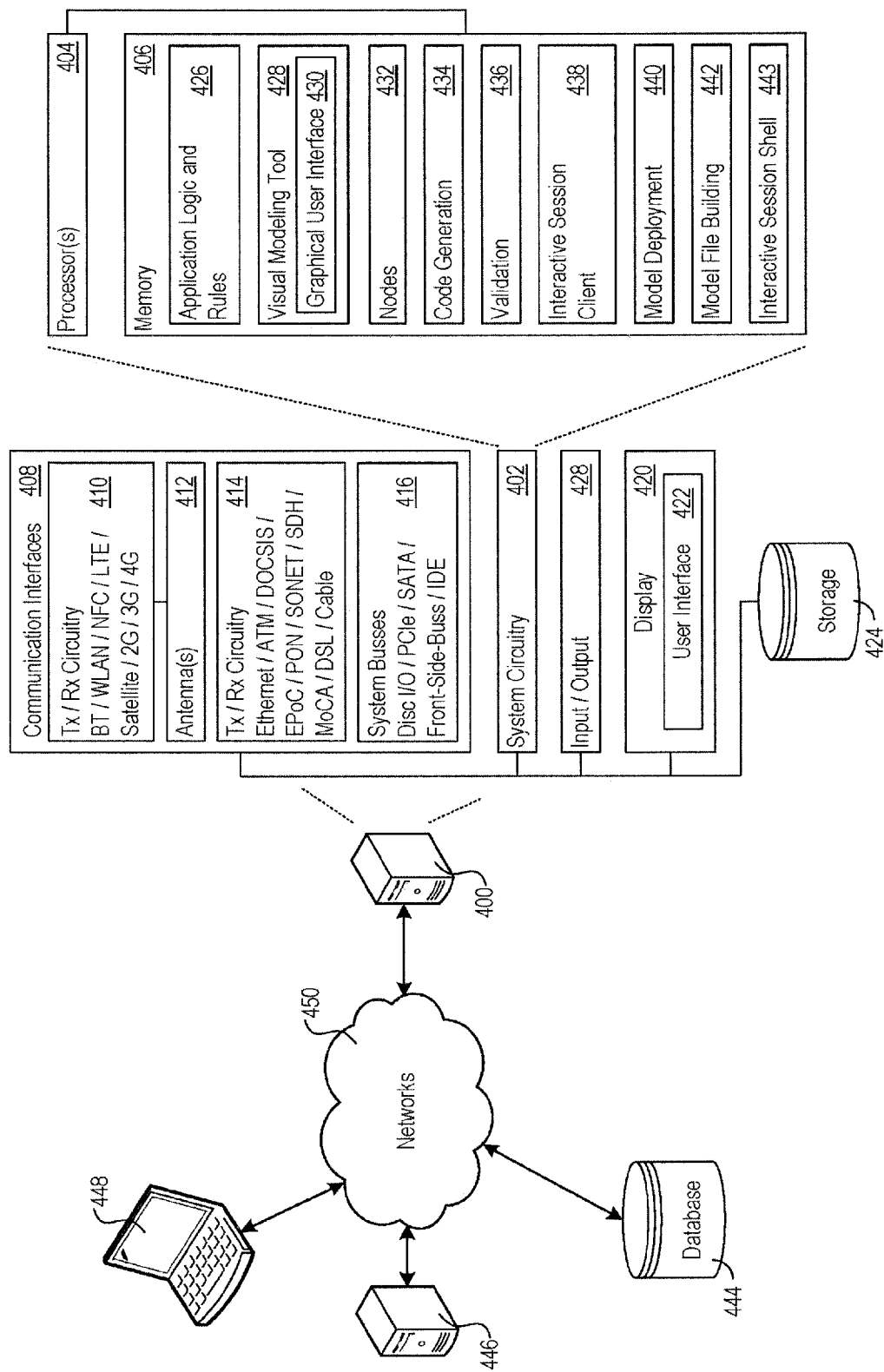
FIG. 4 shows an example system implementation for the visual modeling tool.

FIG. 4 shows an example specific system implementation for the system architecture described above that provides the visual modeling tool 100. In the example in FIG. 4, the visual modelling tool 100 is implemented in the machine 400. According to the system implementation, the machine 400 includes system circuitry 402 to support implementation of the various aspects and functionality discussed above with respect to the various high-level system diagrams and elsewhere. In one embodiment, the system circuitry 402 includes processors 404, memory 406, and/or other circuitry. The processors 404 may be connected to the memory 406 and may comprise a memory system including a plurality of memory devices collocated or distributed across multiple systems. The memory 406 may store control instructions, operational parameters for the control instructions, datasets, and other information. The control instructions may be executed by the processor 404 to implement any of the processing described here, according to a configuration set by the operational parameters. Further, in some embodiments, various circuitry elements of the machine 400 may be implemented by the system circuitry 402.

The memory 406 may store data and instructions for use by the circuitry elements and/or to implement portions of the circuitry elements. The memory 406 includes application logic and rules 426 that provide the logic and rules for operation of the visual modeling circuitry 104. The memory 406 may also include distributed computing cluster interaction instructions, which provide instructions and data to enable the visual modeling tool 100 to interact with one or more run time environments. The memory 406 may also include visual modeling tool instructions 428, which may further include graphical user interface (GUI) instructions and data 430, which instructions enable the system circuitry 402 to implement and provide the GUI 200 of the visual modeling tool 100 to a user. The processors 404, memory 406, and GUI instructions and data 430 may implement portions of the graphical user interface circuitry 105. The memory 406 may also include node data 432, which may include the data needed to provide a node to a user, enable a user to alter configurations and settings, and to provide default settings to a user. The node data 432 may include other data or corresponding code that the node may represent, which can be used by the visual modeling tool to generate code. For example, the node data 432 may include different versions of functional code represented by the node (e.g., one version for execution on the interactive session server 108 and another version for execution on the target distributed computing cluster 116). The memory 406 may also include code generation instructions 434 to enable the visual modeling tool 100 to generate code in accordance with various configurations of the nodes, discussed above. The memory 406 may also include validation instructions 436 to enable the visual modeling tool to validate or check input settings or configurations (e.g., provided by a user) or code generated by the visual modeling tool for errors.

The memory 406 may also include interactive session client instructions 438 to provide interface instructions and protocols to enable the interactive session client circuitry 106 to interact and interface with the interactive session server 108. Similarly, the memory 406 may also include model deployment instructions 440 to provide interface instructions and protocols to enable the model deployment circuitry 114 to interact and interface with the target distributed computing cluster 116 to deploy a model. The memory 406 may also include model file building instructions 442 for gathering executable code and packaging the code and any other required data into a deployment package 112 suitable for deployment on the target distributed computing cluster 116. The memory 406 may also include interactive session shell instructions and data 443 for embodiments where the machine 400 itself implements the interactive session server 108 locally rather than on a remote server.

The machine 400 may also include communication interfaces 408, which may support wireless communication via wireless communication circuitry 410 and antennas 412. Example wireless communication protocols may include Bluetooth, Wi-Fi, WLAN, near field communication protocols, cellular protocols (2G, 3G, 4G, LTE/A), and/or other wireless protocols. Also, communication interface 408 may include wired communication circuitry 414. Example wired communication protocols may include Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax alliance (MoCA) protocols, digital subscriber line (DSL) protocols, cable communication protocols, and/or other networks and network protocols. The communication interfaces 408 may be connected or configured to connect to the networks 450, including the Internet or an intranet, to enable the machine 400 and the system circuitry 402 therein to communicate with other systems and devices (including, for example, the interactive session server 108 or the target distributed computing cluster 116). Additionally, the communication interface 408 includes system busses 416 to effect intercommunication between various elements, components, and circuitry portions of the machine 400. Example system bus implementations include PCIe, SATA, and IDE based buses.

The communication interfaces 408 may enable interconnection of various circuitry components within the machine 400 (e.g., via one or more buses, computer component interfaces, or peripheral component interfaces). For example, the communication interfaces 408 may couple to circuitry elements and databases internally via system busses 416 if internally maintained, or externally via the wireless communication circuitry 410 or the wired communication circuitry 414 if externally maintained. The communication interfaces 408 may also support communication with remote storage 444, client device 448, or remote run time environments 446 (e.g., the interactive session server 108 or the target distributed computing cluster 116).

The communication interfaces 408 may support communication with external client devices 448. Communication with the external client devices 448 may be effected through user interface circuitry and/or with user interface instructions and data 430. A dynamically reconfigurable GUI may be provided to the client devices 448 via the networks 450 to enable interaction between the client devices 448 and the machine 400. In one example, the machine 400 comprises a web server capable of providing web services or web pages to the client device 448. For example, the client device 448 may log into the web server and receive pages corresponding to the GUI 200.

Alternatively, the machine 400 may be a computing device such as a laptop or a personal computer that includes the circuitry and programming necessary to implement the visual modeling tool 100 without the need to interact with a remote server. In such an approach, the machine 400 may itself include various I/O interfaces 418 and/or a display 420, for example, to enable local interaction with the various circuitry elements discussed above instead of or in addition to interaction over the networks 450 with a remote client device 448. In some examples, the display device 420 can provide a user interface 422 to a local user, which can be the same as or a variation of a user interface that can be provided to a remote client device 448.

Additionally, the I/O interfaces 418 and display 420 may enable local maintenance engineers to interact with the machine 400. A local GUI may be provided via the local display 420 to present a control dashboard, actionable insights and/or other information to a maintenance engineer. The local GUI may support portable access, such as, via a web-based GUI, to enable maintenance on the machine 400 or other interaction with the machine 400. This local GUI may be the same as or different from the GUI described elsewhere. The machine 400 may also include a storage device 424 (e.g., a hard drive, solid-state drive, or other memory system) to enable local storage of system software, user interfaces, or system instructions.

Graphical user interface circuitry 105 may be coupled to a user interface database, which may store logic, instructions, code, images, or other content necessary to generate and provide a user interface, and in particular, the GUI 200 of the visual modeling tool 100. The various databases may be implemented on multiple distinct storage devices (e.g., memories or hard drives), on a single storage device, or on a combination thereof. For example, some storage databases may be implemented on a common shared storage device, while other storage databases may be implemented on other distinct storage devices. These storage devices may be local to the machine 400, for example, housed within the machine 400 or directly connected to the machine (e.g., memory 406 or storage device 424). Alternatively, the storage devices, for example, remote storage 444, may be connected to the machine 400 over networks 450 such as an intranet (e.g., local) or via the Internet.

The client device 448 may include, for example, a computer (e.g., laptop), a smartphone, or another electronic device capable of communicating with the machine 400 via the networks 450 or directly. The client device 448 may be a computing device which allows a user to connect to a network 450, such as the Internet. Examples of a client device 448 include, but are not limited to, a personal computer, personal digital assistant ("PDA"), a laptop, a smartphone, a cellular phone, a tablet, or another electronic device. The client device 448 may include a keyboard, keypad, a touch screen interface, or a cursor control device, such as a mouse, or a joystick, a display device, a remote control, and/or any other device operative to view and interact with a user interface. In one embodiment, the client device 448 is configured to request and receive information from the networks 450, for example, using a web browser, such as INTERNET EXPLORER® (sold by Microsoft Corp., Redmond, Wash.) or FIREFOX® (provided by Mozilla). Alternatively, the client device 448 may couple directly to the machine 400 (e.g., via a direct connection or via a local intranet). In another embodiment, the client device 448 and the machine 400 are implemented on the same system, e.g., on a laptop or other computing device. Further technical operational details of the machine 400 are provided below.

In certain embodiments, the graphical user interface circuitry 105 may provide an interface, such as a graphical user interface (GUI) to a remote client device 448 via the networks 450. For example, the machine 400 may provide a graphical representation of the visual modeling tool 100 to the client device 448 via the user interface circuitry 105. The GUI 200 may be provided as a part or portion of a larger software tool or service offering. The GUI 200 may be displayed on a client device 448 or locally via a local display 420. The GUI 200 may be implemented via a web browser operating on the client device 448 and may be display and/or navigated as a web page. Alternatively, the GUI 200 may be implemented as a stand-alone or interconnected software application running on the machine 400 or the client device 448.

Figure 5:
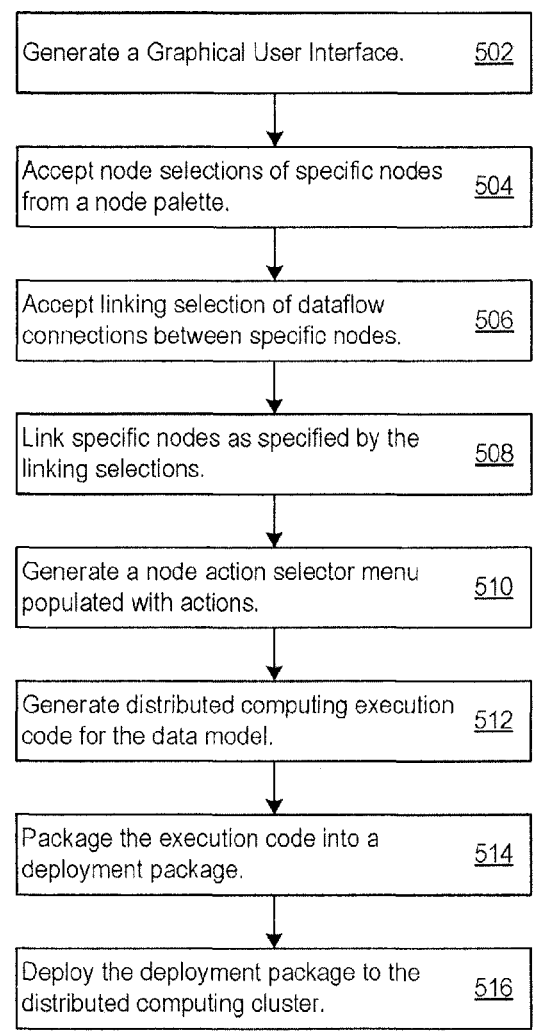
FIG. 5 shows an example flow diagram of logic that the system may implement.

FIG. 5 shows a flow diagram of logic 500 that the visual modeling tool 100 may implement to provide the visual modeling capabilities to a user. For instance, various circuitry elements discussed above may be configured to implement some or all of the logic 500 shown in FIG. 5. The graphical user interface circuitry 105 may generate a graphical user interface (502) of the visual distributed computing design workspace 202. The design workspace 202 may include the node palette 204, the linking tool 208, and the digital canvas 206. The visual modeling circuitry 104 may respond to interactions with the graphical user interface 200 to facilitate visually building a data model. This may include accepting node selections of specific nodes from the node palette (504), placing the specific nodes on the digital canvas, accepting linking selections of dataflow connections between the specific nodes (506), and linking the specific nodes as specified by the linking selections (508).

The flow diagram of logic 500 shown in FIG. 5 may also be implemented by the visual modeling tool 100 as part of a method to build a deployment package 112 of code and deploy the deployment package 112 on a target distributed computing cluster 116. Optionally, the graphical user interface circuitry 105 may also generate a node action selector menu 258 on the visual distributed computing design workspace 202 (510), the node action selector menu 258 populated with actions available on the specific nodes on the digital canvas 206. In certain embodiments, the visual modeling circuitry 104 and/or the model file building circuitry 110 may generate distributed computing execution code for the pre-determined target distributed computing cluster for a data model (512) developed using the GUI 200. The model file building circuitry 110 may then package the distributed computing execution code into a deployment package 112 (514). Model deployment circuitry 114 may then deploy the deployment package 112 to the pre-determined target distributed computing cluster 116 (516).

Figure 6:
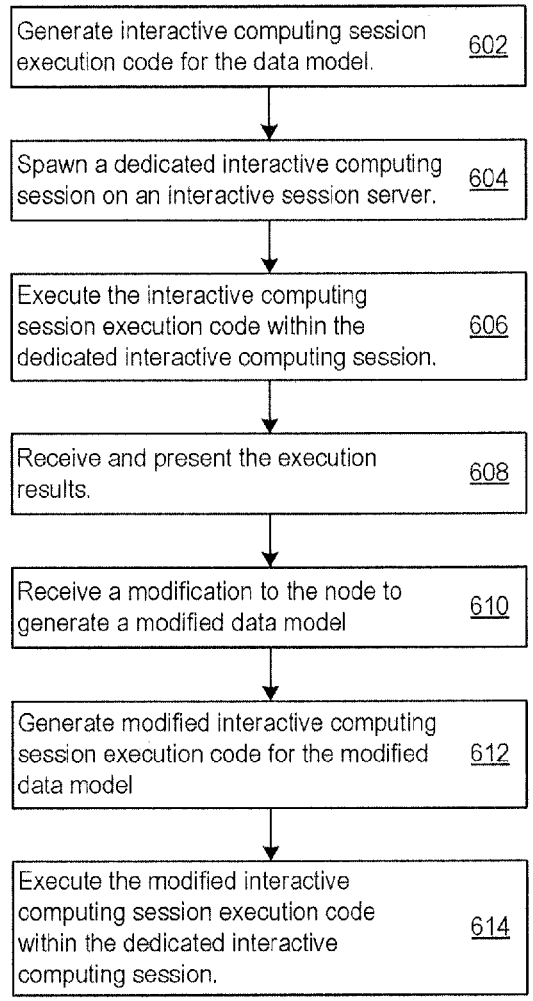
FIG. 6 shows another flow diagram of logic that the system may implement.

FIG. 6 shows a flow diagram of logic 600 that the visual modeling tool 100 may implement for interactively developing a data model using an interactive session server 108. For instance, various circuitry elements discussed above may be configured to implement some or all of the logic 600 shown in FIG. 6. The visual modeling circuitry 104 and/or the interactive session client circuitry 106 may generate interactive computing session execution code for the data model (602). The interactive session client circuitry 106 may spawn a dedicated interactive computing session on the interactive session server 108 (604) and cause the interactive session server 108 to execute the interactive computing session execution code within the dedicated interactive computing session (606). The interactive session client circuitry 106 may also receive, from the interactive session server 108, results from executing the interactive computing session execution code within the dedicated interactive computing session and display or otherwise present the results via the GUI 200 (608).

In certain embodiments, the visual modeling circuitry 104 may receive a modification to the data model by receiving a modification to a node of the data model via the GUI 200 to generate a modified data model (610). The visual modeling circuitry 104 and/or the interactive session client circuitry 106 may generate modified interactive computing session execution code for the modified data model (612). The interactive session client circuitry 106 may cause the interactive session server 108 to execute the modified interactive computing session execution code within the dedicated interactive computing session (614).

So configured, the visual modeling tool 100 enables users, such as data scientists and engineers, to interactively develop data models using visual nodes representing functions of a target distributed computing cluster. The visual modeling tool 100 can replicate a Directed Acyclic Graph (DAG), which may be used, for example, with Spark, OpenCV, R, AWS, Yarn, Hadoop, Impala, Parquet, or other distributed computing run time environments. The visual modeling tool 100 develops and makes changes to the generated code in accordance with the visual layout of the nodes set by the user through the GUI. The visual modeling tool 100 eliminates the need for the user to manually enter any code or changes to code representing a data model, or to even know what specific changes to code would result from making such changes to the visual node layout in the graphical user interface. For example, the visual modeling tool enables a user to make changes to the analytical modeling process without knowing specific technical aspects or code required to implement those changes in the various analytical model run time environments. Further, the visual modeling tool 100 manages the two different use cases (e.g., model development phase, and model application phase) in a manner that hides the underlying technical complexity from the user to provide a single visual modeling tool 100 that performs both use cases in a unified and familiar environment provided to the user independent of the differing underlying technology and complexity for each use case.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
   in a distributed computing design system:
     generating a graphical user interface of a visual distributed computing design workspace, the visual distributed computing design workspace comprising:
       a node palette comprising individually selectable nodes, each with a graphical representation and corresponding to a distributed computing function available on a pre-determined target distributed computing cluster;
       a linking tool for establishing connection links between the individually selectable nodes; and
       a digital canvas;
     with visual modeling circuitry, responding to interactions with the graphical user interface to facilitate visually building a data model by:
       accepting node selections of specific nodes from the node palette;
       placing the specific nodes on the digital canvas;
       accepting linking selections of dataflow connections between the specific nodes; and
       linking the specific nodes as specified by the linking selections to form a representation of the data model;
       generating a node action selector on the visual distributed computing design workspace, the node action selector populated with actions available on each of the specific nodes on the digital canvas when one of the specific node is selected, the actions including a 'show data' action configured to visualize data flowing out of the selected specific node; and
       for each of the selected specific nodes:
         setting a node flag to a first state to indicate that the selected specific node has not been previously processed, when one of the conditions of the selected specific node has not been processed, has been altered or a node linked upstream of the selected specific node has node flag in the first state is met, or setting the node flag to a second state different from the first state to indicate that the node has been previously processed;
         generating an interactive computing session execution code for the data model;
         spawning a dedicated interactive computing session on an interactive session server to isolate execution of the data model from the pre-determined target distributed computing cluster, the interactive session server being different than the pre-determined target distributed computing cluster;
         executing the interactive computing session execution code within the dedicated interactive computing session, wherein the interactive computing session execution code is executed for the selected specific nodes having the node flag in first state and not executed for the selected specific nodes having the node flag in the second state;
         in response to selecting the 'show data' action on the node action selector for the selected one of the specific nodes, providing output data generated by executing the interactive session execution code for the selected one of the specific nodes, and presenting the output data in the graphical user interface, wherein the output data is newly generated by executing the execution code associated with the selected one of the specific nodes when the node flag is set to the first state, and the output data is a previously stored output data generated in a prior iteration of processing the execution code when the node flag is set to the second state;
         presenting execution results for the data model within the dedicated interactive computing session;
         generating distributed computing execution code for the data model, the distributed computing execution code generated for the pre-determined target distributed computing cluster;
         packaging the distributed computing execution code into a deployment package; and
         deploying the deployment package to the pre-determined target distributed computing cluster.

2. The method of claim 1, where:
   the individually selectable nodes comprise input definition nodes, data exploration nodes, data preparation nodes, modeling nodes, back testing nodes, or any combination thereof.

3. The method of claim 1 where:
   the actions further comprise: an 'edit' action configured to change a node configuration, and in response to selecting the 'edit' action for the selected specific node, a settings page associated with the selected specific node is displayed in the graphical user interface, the settings page including features, setting or commands specific to the function of the selected specific node.

4. The method of claim 1, where:
   the actions comprise a 'run' action configured to cause an interaction with a computing engine external to the distributed computing design system.

5. The method of claim 1, where:
   the actions comprise a 'deploy' action configured to select a path from a chosen node on the digital canvas to a pre-determined start point including a set of nodes, and designate the path as a behavioral representation of an overall model for the set of nodes on the digital canvas.

6. A system comprising:
   graphical user interface circuitry configured to generate a graphical user interface of a visual distributed computing design workspace, the visual distributed computing design workspace comprising:
- a node palette comprising individually selectable nodes, each with a graphical representation and corresponding to a distributed computing function available on a pre-determined target distributed computing cluster;
- a linking tool for establishing connection links between the individually selectable nodes; and
- a digital canvas; and modeling circuitry responsive to interactions with the graphical user interface to facilitate visually building a data model, the modeling circuitry configured to:
- accept node selections of specific nodes from the node palette;
- place the specific nodes on the digital canvas;
- accept linking selections of dataflow connections between the specific nodes; and
- link the specific nodes as specified by the linking selections to form a representation of the data model;
- generate a node action selector on the visual distributed computing design workspace, the node action selector populated with actions available on each of the specific nodes on the digital canvas when one of the specific node is selected, the actions including a 'show data' action configured to visualize data flowing out of the selected specific node; and
- for each of the selected specific nodes:
  - set a node flag to a first state to indicate that the selected specific node has not been previously processed when one of the conditions of the selected specific node has not been processed, has been altered or a node linked upstream of the selected specific node has node flag in the first state is met, or set the node flag to a second state different from the first state to indicate that the node has been previously processed;

interactive session client circuitry further configured to:
- generate an interactive computing session execution code for the data model;
- spawn a dedicated interactive computing session on an interactive session server to isolate execution of the data model from the pre-determined target distributed computing cluster, the interactive session server being different than the pre-determined target distributed computing cluster;
- execute the interactive computing session execution code within the dedicated interactive computing session, wherein the interactive computing session execution code is executed for the selected specific nodes having the node flag in first state and not executed for the selected specific nodes having the node flag in the second state;
- in response to selection of the 'show data' action on the node action selector for the selected one of the specific nodes, provide output data generated by the selected one of the specific nodes, and present the output data in the graphical user interface, wherein the output data is newly generated by executing the execution code associated with the selected one of the specific nodes when the node flag is set to the first state, and the output data is a previously stored output data generated in a prior iteration of processing the execution code when the node flag is set to the second state;
- present execution results for the data model within the dedicated interactive computing session; and model file building circuitry operable to:
- generate distributed computing execution code for the data model, the distributed computing execution code generated for execution in the pre-determined target distributed computing cluster;
- package the distributed computing execution code into a deployment package; and
- deploy the deployment package to the pre-determined target distributed computing cluster.

7. The system of claim 6, where:
the individually selectable nodes comprise input definition nodes, data exploration nodes, data preparation nodes, modeling nodes, back testing nodes, or any combination thereof.

8. The system of claim 6, where:
the actions comprise: an 'edit' action configured to change a node configuration, and in response to selection of the 'edit' action for a selected specific node, the interactive session client circuitry is further configured to display a settings page associated with the selected specific node in the graphical user interface, the settings page including features, setting or commands specific to the function of the selected node.

9. The system of claim 6, where:
the actions comprise a 'run' action configured to cause an interaction with the interactive session server external to the distributed computing design system.

10. The system of claim 6, where:
the actions comprise a 'deploy' action configured to select a path from a chosen node on the digital canvas to a pre-determined start point including a set of nodes, and designate the path as a behavioral representation of an overall model for the set of nodes on the digital canvas.

11. A method comprising:
at a visual modeling machine:
- providing a graphical user interface comprising a visual distributed computing design workspace;
- receiving selection of nodes and a linking selection linking one selected node to at least one other node, the linking selection comprising a portion of a data model;
- generating a node action selector on the visual distributed computing design workspace, the node action selector populated with actions available on the node when a specific node is selected, the actions including a 'show data' action configured to visualize data flowing out of the selected specific node;
- setting a node flag for the selected specific node to a first state to indicate that the selected specific node has not been previously processed when one of the conditions of the selected specific node has not been processed, been altered or a node linked upstream of the selected specific node has a node flag in the first state is met, or setting the node flag for the selected specific node to a second state different from the first state to indicate that the node has been previously processed;
- generating interactive computing session execution code for the data model;
- spawning a dedicated interactive computing session on an interactive session server to isolate execution of the data model from the pre-determined target distributed computing cluster, the interactive session server being different than the target distributed computing cluster;
- causing the interactive session server to execute the interactive computing session execution code within the dedicated interactive computing session, wherein the interactive computing session execution code is executed for the selected specific node having the node flag in first state and not executed for the selected specific node having the node flag in the second state;

in response to selecting the 'show data' action on the node action selector for the selected specific node, providing output data generated by the selected specific node, and presenting the output data in the graphical user interface, wherein the output data is newly generated by executing the execution code associated with the selected specific node when the node flag is set to the first state and the output data is a previously stored output data generated in a prior iteration of execution when the node flag is set to the second state;

training the interactive computing session execution code with a subset of data to develop a trained data model;

generating distributed computing execution code for the trained data model, the distributed computing execution code generated for execution in the pre-determined target distributed computing cluster;

packaging, by model file building circuitry, the distributed computing execution code into a deployment package; and deploying, by model deployment circuitry, the deployment package to the pre-determined target distributed computing cluster.

12. The method of claim 11 further comprising:
providing a node palette comprising individually selectable nodes, each with a graphical representation and corresponding to a distributed computing function available on the pre-determined target distributed computing cluster.

13. The method of claim 11, further comprising:
receiving, from the interactive session server, results from executing the interactive computing session execution code within the dedicated interactive computing session; and displaying the results via the graphical user interface.

14. The method of claim 11, further comprising:
after training the interactive computing session execution code to develop the trained data model, setting a training flag within the node and/or storing the trained data model as a model variable within the dedicated interactive computing session.

* * * * *